(12) United States Patent
Perez et al.

(10) Patent No.: US 12,314,847 B2
(45) Date of Patent: May 27, 2025

(54) TRAINING OF MACHINE READING AND COMPREHENSION SYSTEMS

(71) Applicant: Naver Corporation, Gyeonggi-do (KR)

(72) Inventors: Julien Perez, Grenoble (FR); Quentin Grail, Meylan (FR)

(73) Assignee: NAVER CORPORATION, Gyeonggi-Do (KR)

( * ) Notice: Subject to any disclaimer, the term of this patent is extended or adjusted under 35 U.S.C. 154(b) by 1369 days.

(21) Appl. No.: 16/513,208

(22) Filed: Jul. 16, 2019

(65) Prior Publication Data

US 2020/0134449 A1 Apr. 30, 2020

Related U.S. Application Data

(60) Provisional application No. 62/750,931, filed on Oct. 26, 2018.

(51) Int. Cl.
*G06N 3/08* (2023.01)
*G06F 40/205* (2020.01)
*G06N 3/045* (2023.01)
*G06N 3/063* (2023.01)

(52) U.S. Cl.
CPC .............. *G06N 3/08* (2013.01); *G06F 40/205* (2020.01); *G06N 3/045* (2023.01); *G06N 3/063* (2013.01)

(58) Field of Classification Search
CPC ........ G06N 3/08; G06N 3/0454; G06N 3/063; G06F 40/205
See application file for complete search history.

(56) References Cited

U.S. PATENT DOCUMENTS

| | | | |
|---|---|---|---|
| 2017/0317983 A1* | 11/2017 | Kompalli | G06F 21/6209 |
| 2017/0337479 A1* | 11/2017 | Trischler | G06F 40/279 |
| 2019/0188562 A1* | 6/2019 | Edwards | G06N 5/045 |
| 2019/0258939 A1* | 8/2019 | Min | G06N 3/0442 |
| 2020/0019642 A1* | 1/2020 | Dua | G06F 16/3329 |

OTHER PUBLICATIONS

Bao et al. ("Question generation with doubly adversarial nets." IEEE/ACM Transactions on Audio, Speech, and Language Processing 26.11Date of Publication Jul. 25, 2018; date of current version Aug. 13, 2018) (Year: 2018).*

Wong ("Dancin seq2seq: Fooling text classifiers with adversarial text example generation." arXiv preprint arXiv:1712.05419 (2017). (Year: 2017).*

Liu et al. (Gated End-to-End Memory Networks, arXiv:1610.04211v2 [cs.CL] Nov. 17, 2016) (Year: 2016).*

Sukhbaatar et al. ("End-to-end memory networks." Advances in neural information processing systems 28 (2015) (Year: 2015).*

(Continued)

*Primary Examiner* — Mohamed Abou El Seoud
*Assistant Examiner* — Moriam Mosunmola Godo

(57) ABSTRACT

A method of using a first neural network includes: by the first neural network, receiving a text; by the first neural network, receiving a question concerning the text; and by the first neural network, determining an answer to the question using the text, where the first neural network is trained to answer the question about the text adversarially by a second neural network that is trained to maximize a likelihood of failure of the first neural network to correctly answer questions.

18 Claims, 8 Drawing Sheets

(56) References Cited

OTHER PUBLICATIONS

Jia et al. (Adversarial Examples for Evaluating Reading Comprehension Systems, arXiv:1707.07328v1 [cs.CL] Jul. 23, 2017) (Year: 2017).*
Gao et al. (Difficulty Controllable Question Generation for Reading Comprehension, arXiv:1807.03586v1 [cs.CL] Jul. 10, 2018) (Year: 2018).*
Buck et al. ("Ask the right questions: Active question reformulation with reinforcement learning." arXiv preprint arXiv:1705.07830 (2017) (Year: 2017).*
Zhou et al. ("Gated end-to-end memory network based on attention mechanism." 2018 International Conference on Orange Technologies (ICOT). IEEE, Oct. 25, 2018) (Year: 2018).*
Hu et al. ("Attention-guided answer distillation for machine reading comprehension." arXiv preprint arXiv:1808.07644 (Sep. 17, 2018) (Year: 2018).*
Adam Trischler, Tong Wang, Xingdi Yuan, Justin Harris, Alessandro Sordoni, Philip Bachman, and Kaheer Suleman. Newsqa: A machine comprehension dataset. CoRR, abs/1611.09830, 2016a. URL http://arxiv.org/abs/1611.09830.
Adam Trischler, Zheng Ye, Xingdi Yuan, and Kaheer Suleman. Natural language comprehension with the epireader. CoRR, abs/1606.02270, 2016b. URL http://arxiv.org/abs/1606.02270.
Alessandro Sordoni, Phillip Bachman, and Yoshua Bengio. Iterative alternating neural attention for machine reading. CoRR, abs/1606.02245, 2016. URL http://arxiv.org/abs/1606.02245.
Anonymous Authors. Adversarial Reading Networks for Machine Comprehension. 2018.
Danqi Chen, Jason Bolton, and Christopher D. Manning. A thorough examination of the CNN/dailymail reading comprehension task. CoRR, abs/1606.02858, 2016. URL http://arxiv.org/abs/1606.02858.
David Silver, Aja Huang, Chris J. Maddison, Arthur Guez, Laurent Sifre, George van den Driessche, Julian Schrittwieser, Ioannis Antonoglou, Vedavyas Panneershelvam, Marc Lanctot, Sander Dieleman, Dominik Grewe, John Nham, Nal Kalchbrenner, Ilya Sutskever, Timothy P. Lillicrap, Madeleine Leach, Koray Kavukcuoglu, Thore Graepel, and Demis Hassabis. Mastering the game of go with deep neural networks and tree search. Nature, 529(7587):484-489, 2016. doi: 10.1038/nature16961. URL https://doi.org/10.1038/nature16961.
Diederik P. Kingma and Jimmy Ba. Adam: A method for stochastic optimization. CoRR, abs/1412.6980, 2014. URL http://arxiv.org/abs/1412.6980.
Duyu Tang, Bing Qin, and Ting Liu. Aspect level sentiment classification with deep memory network. CoRR, abs/1605.08900, 2016. URL http://arxiv.org/abs/1605.08900.
Felix Hill, Antoine Bordes, Sumit Chopra, and Jason Weston. The goldilocks principle: Reading children's books with explicit memory representations. CoRR, abs/1511.02301, 2015b. URL http://arxiv.org/abs/1511.02301.
Gerald Tesauro. Temporal difference learning and td-gammon. Commun. ACM, 38(3):58-68, Mar. 1995. ISSN 0001-0782. doi: 10.1145/203330.203343. URL http://doi.acm.org/10.1145/203330.203343.
Henk Mannen. Learning to play chess using reinforcement learning with database games. Phil. uu.nl/preprints/ckiscripties, pp. 11-34, 2003.
Hongning Wang, Yue Lu, and Chengxiang Zhai. Latent aspect rating analysis on review text data: A rating regression approach. In Proceedings of the 16th ACM SIGKDD International Conference on Knowledge Discovery and Data Mining, KDD '10, pp. 783-792, New York, NY, USA, 2010. ACM. ISBN 978-1-4503-0055-1. doi: 10.1145/1835804.1835903. URL http://doi.acm.org/10.1145/1835804.1835903.
Ian J. Goodfellow, Jonathon Shlens, and Christian Szegedy. Explaining and harnessing adversarial examples. CoRR, abs/1412.6572, 2014. URL http://arxiv.org/abs/1412.6572.
Jason Weston, Antoine Bordes, Sumit Chopra, and Tomas Mikolov. Towards ai-complete question answering: A set of prerequisite toy tasks. CoRR, abs/1502.05698, 2015. URL http://arxiv.org/abs/1502.05698.
Jason Weston, Sumit Chopra, and Antoine Bordes. Memory networks. CoRR, abs/1410.3916, 2014. URL http://arxiv.org/abs/1410.3916.
Jeffrey Pennington, Richard Socher, and Christopher D. Manning. Glove: Global vectors for word representation. In Empirical Methods in Natural Language Processing (EMNLP), pp. 1532-1543, 2014. URL http://www.aclweb.org/anthology/D14-1162.
Julien Perez and Fei Liu. Gated end-to-end memory networks. CoRR, abs/1610.04211, 2016. URL http://arxiv.org/abs/1610.04211.
Julien Perez. Dialog state tracking, a machine reading approach using a memory-enhanced neural network. CoRR, abs/1606.04052, 2016. URL http://arxiv.org/abs/1606.04052.
Karl Moritz Hermann, Tomás Kociský, Edward Grefenstette, Lasse Espeholt, Will Kay, Mustafa Suleyman, and Phil Blunsom. Teaching machines to read and comprehend. CoRR, abs/1506.03340, 2015. URL http://arxiv.org/abs/1506.03340.
Laurens Maaten, Minmin Chen, Stephen Tyree, and Kilian Q. Weinberger. Learning with marginalized corrupted features. In Sanjoy Dasgupta and David Mcallester (eds.), Proceedings of the 30th International Conference on Machine Learning (ICML-13), vol. 28, pp. 410-418. JMLR Workshop and Conference Proceedings, 2013. URL http://jmlr.csail.mit.edu/proceedings/papers/v28/vandermaaten13.pdf.
M. van der Ree and Marco Wiering. Reinforcement learning in the game of othello: Learning against a fixed opponent and learning from self-play. In Proceedings of the 2013 IEEE Symposium on Adaptive Dynamic Programming and Reinforcement Learning, ADPRL 2013, IEEE Symposium Series on Computational Intelligence (SSCI), Apr. 16-19, 2013, Singapore, pp. 108-115, 2013. doi: 10.1109/ADPRL.2013.6614996. URL https://doi.org/10.1109/ADPRL.2013.6614996.
Matthew Richardson, Christopher J.C. Burges, and Erin Renshaw. MCTest: A challenge dataset for the open-domain machine comprehension of text. In Proc. EMNLP, 2013.
Min Joon Seo, Aniruddha Kembhavi, Ali Farhadi, and Hannaneh Hajishirzi. Bidirectional attention flow for machine comprehension. CoRR, abs/1611.01603, 2016. URL http://arxiv.org/abs/1611.01603.
Nitish Srivastava, Geoffrey E. Hinton, Alex Krizhevsky, Ilya Sutskever, and Ruslan Salakhutdinov. Dropout: a simple way to prevent neural networks from overfitting. Journal of Machine Learning Research, 15(1):1929-1958, 2014. URL http://dl.acm.org/citation.cfm?id=2670313.
Payal Bajaj, Daniel Campos, Nick Craswell, Li Deng, Jianfeng Gao, Xiaodong Liu, Rangan Majumder, Andrew McNamara, Bhaskar Mitra, Tri Nguyen, Mir Rosenberg, Xia Song, Alina Stoica, Saurabh Tiwary, and Tong Wang. MS MARCO: A human generated machine reading comprehension dataset. CoRR, abs/1611.09268, 2016. URL http://arxiv.org/abs/1611.09268.
Pranav Rajpurkar, Jian Zhang, Konstantin Lopyrev, and Percy Liang. Squad: 100, 000+ questions for machine comprehension of text. CoRR, abs/1606.05250, 2016. URL http://arxiv.org/abs/1606.05250.
Robin Jia and Percy Liang. Adversarial examples for evaluating reading comprehension systems. In Empirical Methods in Natural Language Processing (EMNLP), 2017.
Rudolf Kadlec, Martin Schmid, Ondrej Bajgar, and Jan Kleindienst. Text understanding with the attention sum reader network. CoRR, abs/1603.01547, 2016. URL http://arxiv.org/abs/1603.01547.
Takeru Miyato, Andrew M. Dai, and Ian J. Goodfellow. Virtual adversarial training for semisupervised text classification. CoRR, abs/1605.07725, 2016. URL http://arxiv.org/abs/1605.07725.
Tong Wang, Xingdi Yuan, and Adam Trischler. A joint model for question answering and question generation. CoRR, abs/1706.01450, 2017. URL http://arxiv.org/abs/1706.01450.
Tsendsuren Munkhdalai and Hong Yu. Neural semantic encoders. CoRR, abs/1607.04315, 2016. URL http://arxiv.org/abs/1607.04315.

(56) References Cited

OTHER PUBLICATIONS

Tsung-Hsien Wen, Milica Gasic, Nikola Mrksic, Lina Maria Rojas-Barahona, Pei-Hao Su, Stefan Ultes, David Vandyke, and Steve J. Young. A network-based end-to-end trainable task-oriented dialogue system. CoRR, abs/1604.04562, 2016. URL http://arxiv.org/abs/1604.04562.

Xiaoxiao Guo, Tim Klinger, Clemens Rosenbaum, Joseph P. Bigus, Murray Campbell, Ban Kawas, Kartik Talamadupula, and Gerald Tesauro. Learning to query, reason, and answer questions on ambiguous texts. 2017.

Xingdi Yuan, Tong Wang, C, aglar Gülçehre, Alessandro Sordoni, Philip Bachman, Sandeep Subramanian, Saizheng Zhang, and Adam Trischler. Machine comprehension by text-to-text neural question generation. CoRR, abs/1705.02012, 2017. URL http://arxiv.org/abs/1705.02012.

Yelong Shen, Po-Sen Huang, Jianfeng Gao, and Weizhu Chen. Reasonet: Learning to stop reading in machine comprehension. CoRR, abs/1609.05284, 2016. URL http://arxiv.org/abs/1609.05284.

Yiming Cui, Zhipeng Chen, Si Wei, Shijin Wang, Ting Liu, and Guoping Hu. Attention-overattention neural networks for reading comprehension. CoRR, abs/1607.04423, 2016. URL http://arxiv.org/abs/1607.04423.

Yoon Kim. Convolutional neural networks for sentence classification. CoRR, abs/1408.5882, 2014. URL http://arxiv.org/abs/1408.5882.

* cited by examiner

TRAINING OF MACHINE READING AND COMPREHENSION SYSTEMS

CROSS-REFERENCE TO RELATED APPLICATIONS

This application claims the benefit of U.S. Provisional Application No. 62/750,931, filed on Oct. 26, 2018. The entire disclosure of the application referenced above is incorporated herein by reference.

FIELD

The present disclosure relates to machine reading and comprehension systems and methods and more particularly to systems and methods for training machine reading and comprehension systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, etc.

SUMMARY

In a feature, a computer-executable method for training a machine reading network includes: by a first neural network, analyzing a first text corpus extracted from a training dataset comprising a plurality of text corpuses; by a second neural network, obfuscating words of a passage of the first text corpus in order to train the first neural network, the obfuscation producing a first corrupted text corpus; by the second neural network, generating a first question about content of the first corrupted text corpus; by the first neural network, analyzing the first corrupted text corpus and determining a first answer to the first question based on the first corrupted text corpus; by the second neural network, analyzing the first answer of the first neural network and generating a first performance index for the first neural network based on the first answer, the first performance index representing a first answering performance of the first neural network given the obfuscation of the first corrupted text corpus; by the second neural network storing the first performance index in memory; by the second neural network, generating a second corrupted text corpus by obfuscating words of a second text corpus extracted from the training dataset, the obfuscation being based on the first performance index of the first neural network; by the second neural network, generating a second question about content of the second corrupted text corpus; by the first neural network, analyzing the second corrupted text corpus and determining a second answer to the second question based on the second corrupted text corpus; by the second neural network, analyzing the second answer of the first neural network and generating a second performance index for the first neural network based on the second answer, the second performance index representing a second answering performance of the first neural network given the obfuscation of the second corrupted text corpus; and by the second neural network storing the second performance index in memory.

In further features, the obfuscation includes marking the words as unknown in the first and second corrupted text corpuses.

In further features, the method further includes: by the second neural network, generating a third corrupted text corpus by obfuscating words of a third text corpus extracted from the training dataset, the obfuscation being based on the first performance index of the first neural network and the second performance index of the first neural network; by the second neural network, generating a third question about content of the third corrupted text corpus; by the first neural network, analyzing the third corrupted text corpus and determining a third answer to the third question based on the third corrupted text corpus; by the second neural network, analyzing the third answer of the first neural network and generating a third performance index for the first neural network based on the third answer, the third performance index representing a third answering performance of the first neural network given the obfuscation of the third corrupted text corpus; and by the second neural network storing the third performance index in memory.

In further features, a system includes memory storing instructions for performing the method and a processor, in communication with the memory, which executes the instructions.

In further features, the first neural network is a gated end-to-end memory network (GMemN2N), and the second neural network is a GMemN2N.

In further features, the method further includes: by the first neural network, receiving a text corpus and a question regarding the text corpus from a user device; by the first neural network, determining an answer to the question based on the text corpus; and by the first neural network, transmitting the answer to the user device.

In further features, a network for training a machine reading network includes a neural network configured to train a machine reading network by implementing the method.

In further features, a computer-readable medium includes a computer program product including code instructions for executing the method.

In a feature, a computer-executable method for training a machine reading network includes: training a first neural network to analyze text corpuses and to answer questions regarding passages of the text corpuses; and training a second neural network to generate a first corrupted text corpus by obfuscating words of a first passage of a first text corpus in order to minimize a probability of the first neural network correctly answering a first question regarding the first corrupted text corpus, where the training the second neural network includes training the second neural network to: analyze a first answer of the first neural network to the first question; assess a bias in the first answer caused by the obfuscation of the words of the passage of the first text corpus; and based on the bias in the first answer of the first neural network, generate a second corrupted text corpus by obfuscating words of a second passage of a second text corpus.

In further features, the method further includes: by the second neural network, rating performances of the first neural network in answering questions and storing data indicative of the performances of the first neural network, where generating the second corrupted text corpus includes obfuscating words of the second passage of the second text corpus based on the data indicative of the performances in order to maximize the bias of the first neural network.

In further features, the first neural network is a gated end-to-end memory network (GMemN2N), and the second neural network is a GMemN2N.

In further features, the generating the second text corpus includes, based on the bias in the first answer of the first neural network, generating the second corrupted text corpus by obfuscating words of the second passage of the second text corpus to minimize a second probability of the first neural network correctly answering a second question regarding the second corrupted text corpus.

In further features, the method further includes: after the training of the first neural network: receiving, by the first neural network from a user device, a text corpus and a question about the text corpus; determining, by the first neural network, an answer to the question using the text corpus; and transmitting, by the first neural network to the user device, the answer to the question.

In further features, a non-transitory computer readable medium includes code including instructions to execute the method for training a machine reading network.

In a feature, a method of using a first neural network includes: by the first neural network, receiving a text; by the first neural network, receiving a question concerning the text; and by the first neural network, determining an answer to the question using the text, where the first neural network is trained to answer the question about the text adversarially by a second neural network that is trained to maximize a likelihood of failure of the first neural network to correctly answer questions.

In further features, the method further includes, by the second neural network, adversarially training the first neural network by selectively obfuscating words in stories of a training dataset.

In further features, the method further includes, by the second neural network, presenting the first neural network with progressively harder questions regarding the stories.

In further features, the method further includes, by the second neural network, altering the text by selectively obfuscating a word in each text for which the first neural network provides an answer.

In further features, by the second neural network, choosing the word to obfuscate to maximize a probability of failure by the first neural network.

In further features, the method further includes, after the training of the first neural network: receiving, by the first neural network from a user device, a text corpus and a question about the text corpus; determining, by the first neural network, an answer to the question using the text corpus; and transmitting, by the first neural network to the user device, the answer to the question.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Machine reading and comprehension is progressing. Training of a machine comprehension system may be bounded to supervised training, and available question answering may be limited to available question answering datasets.

The present disclosure relates to training of a question answering system. The search system receives queries including text and questions about the text from user computing devices, such as cellular phones, tablets, etc. The question answering system determines answers for the queries, respectively. The question answering system provides the answers to the user computing devices from which the queries were received, respectively.

According to the present disclosure, the question answering system is trained adversarially to comprehend the text. During training, a training system obfuscates words of text that are sent to the question answering system. The training system obfuscates progressively harder portions of the text in order to minimize the probability of the question answering system successfully (correctly) responding to a question about the text. Training the question answering system adversarially as described herein overcomes the boundaries of strict supervised training of the question answering system and makes the question answering system more robust to noise in the question answering setting.

Figure 1:
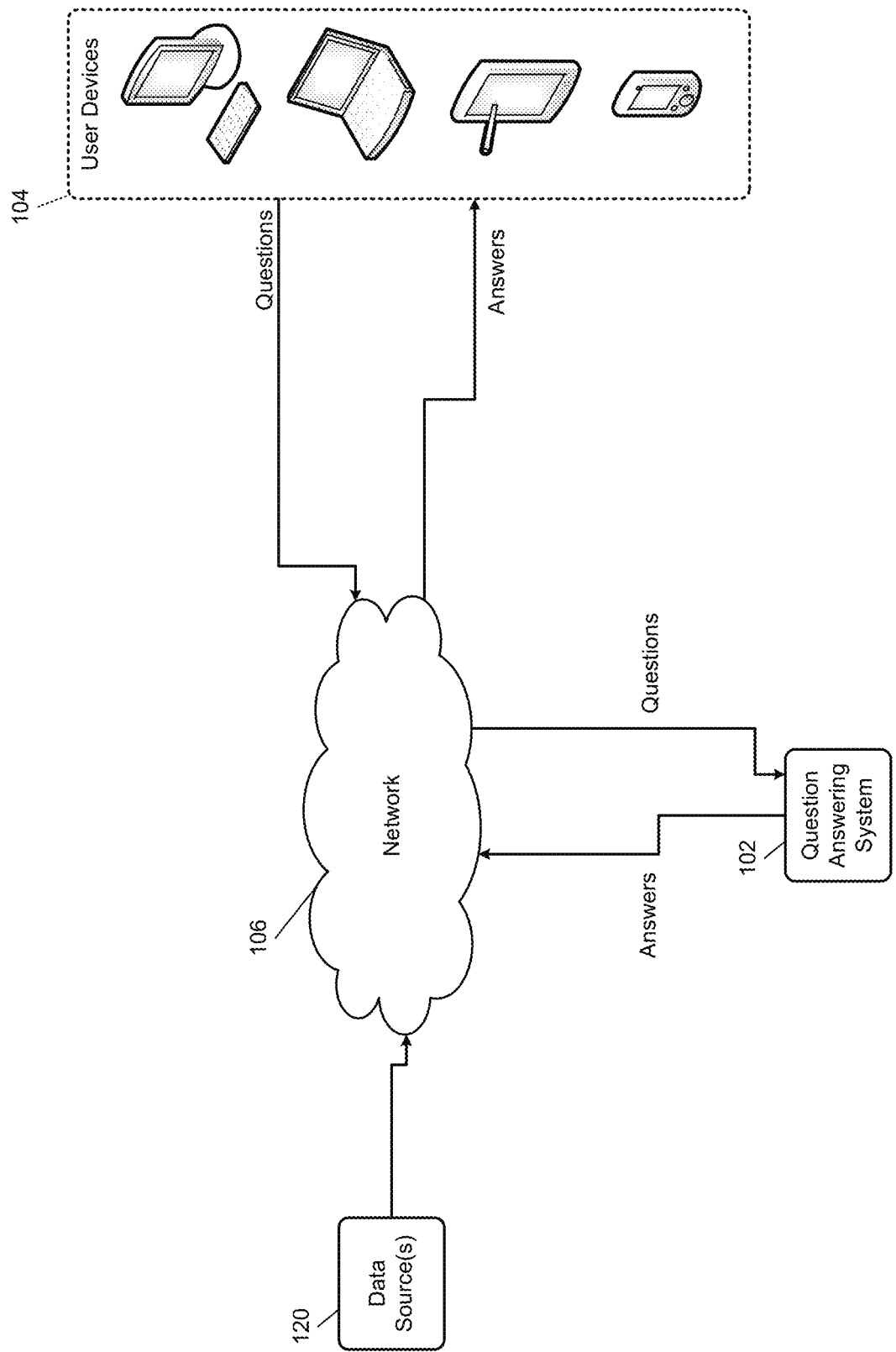
FIG. 1 includes a functional block diagram of an example environment including a question answering system configured provide answers in response to questions.

FIG. 1 includes a functional block diagram including a question answering system 102 configured to respond to queries. The question answering system 102 is configured to receive queries about one or more bodies of text (e.g., novels, news articles, documents, etc.) from one or more user computing device(s) 104 via a network 106. The bodies of text may be received with the queries and/or stored in memory at the question answering system 102 and retrieved based on the queries.

The question answering system 102 reads the bodies of text and determines answers to the questions from the bodies of text, respectively. The question answering system 102 may transmits the answers back to the user devices 104 that transmitted the questions, respectively.

The user devices 104 may display the answers to users. The user devices 104 may also display other information to the users. For example, the user devices 104 may display additional information related to the bodies of text, respectively, information relevant to the answers, respectively, etc. The question answering system 102 and the user devices 104 communicate via a network 106.

A plurality of different types of user devices 104 are illustrated in FIG. 1. An individual user computing device may also be referred to herein as a user device 104. The user devices 104 include any type of computing devices that is configured to generate and transmit questions regarding text to the question answering system 102 via the network 106. Examples of the user devices 104 include, but are not limited to, smart (cellular) phones, tablet computers, laptop computers, and desktop computers, as illustrated in FIG. 1. The user devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The user devices 104 may use a variety of different operating systems. In an example where a user device 104 is a mobile device, the user device 104 may run an operating system including, but not limited to, Android, iOS developed by Apple Inc., or Windows Phone developed by Microsoft Corporation. In an example where a user device 104 is a laptop or desktop device, the user device 104 may run an operating system including, but not limited to, Microsoft Windows, Mac OS, or Linux. The user devices 104 may also access the question answering system 102 while running operating systems other than those operating systems described above, whether presently available or developed in the future.

In some examples, a user device 104 may communicate with the question answering system 102 using an application installed on the user device 104. In general, a user device 104 may communicate with the question answering system 102 using any application that can transmit questions to the question answering system 102 to be answered by the question answering system 102. In some examples, a user device 104 may run an application that is dedicated to interfacing with the question answering system 102, such as an application dedicated to question answering. In some examples, a user device 104 may communicate with the question answering system 102 using a more general application, such as a web-browser application. The application executed by a user device 104 to communicate with the question answering system 102 may display a search field on a graphical user interface (GUI) in which the user may enter questions. The user may enter a question using a touchscreen or physical keyboard, a speech-to-text program, or other form of user input.

A question entered into a GUI on a user device 104 may include words, numbers, letters, punctuation marks, and/or symbols. In general, a question may be a request for information retrieval (e.g., an answer) from the question answering system 102. For example, a question may be directed to providing an answer from a specific body of text that is responsive to the question.

A user device 104 may receive an answer from the question answering system 102 that is responsive to the question transmitted to the question answering system 102. In various implementations, the user device 104 may receive and the question answering system 102 may transmit more than one answer that is responsive to the question. In the example of the question answering system 102 providing multiple answers, the question answering system 102 may determine a confidence value (indicative of a likelihood of that the answer is correct) for each of the individual answers and provide the confidence values along with the answers to the user device 104. The user device 104 may display more than one of the multiple answers (e.g., all answers having a confidence value that is greater than a predetermined value), only the answer with the highest confidence value, etc.

The user device 104 may be running an application including a GUI that displays the answer(s) received from the question answering system 102. The respective confidence value(s) may also be displayed. For example, the application used to transmit the question to the question answering system 102 may also present (e.g., display or speak) the received answer(s) to the user. As described above, the application that presents the received answer(s) to the user may be dedicated to interfacing with the question answering system 102 in some examples. In other examples, the application may be a more general application, such as a web-browser application.

The GUI of the application running on the user device 104 may display the answer(s) to the user in a variety of different ways, depending on what information is transmitted to the user device 104. In examples where the search results include a list of answers and associated confidence values, the question answering system 102 may transmit the list of answers and respective confidence values to the user device 104. In this example, the GUI may display the answer(s) and the confidence value(s) to the user as a list of possible answers.

In some examples, the question answering system 102, or other computing system, may transmit additional information to the user device 104 such as, but not limited to, applications and/or other information associated with the body of text, the question, or the answer, other bodies of text associated with the body of text, etc. This additional information may be stored in a data store and transmitted by the question answering system 102 to the user device 104 in some examples. In examples where the user device 104 receives the additional information, the GUI may display the additional information along with the answer(s). In some examples, the GUI may display the answers as a list of applications ordered from the top of the screen to the bottom of the screen by descending conference value. In some examples, the answers may be displayed under the search field in which the user entered the question.

In some examples, user devices 104 may communicate with the question answering system 102 via a partner computing system. The partner computing system may include a computing system of a third party that may leverage the search functionality of the question answering system 102. The partner computing system may belong to a company or organization other than that which operates the question answering system 102. Example third parties which may leverage the functionality of the question answering system 102 may include, but are not limited to, internet search providers and wireless communications service providers. The user devices 104 may send questions to the question answering system 102 via the partner computing system. The user devices 104 may also receive answers from the question answering system 102 via the partner computing system. The partner computing system may provide a user interface to the user devices 104 in some examples and/or modify the user experience provided on the user devices 104.

As stated above, the user devices 104 may transmit the body of text from which to generate the answer along with the question (for the body of text). Alternatively, the question answering system 102 may obtain the body of text from a data source 120. Bodies of text may also be referred to as text corpuses. The data sources 120 may include a variety of different text providers. The data sources 120 may include digital distribution platforms such as, but are not limited to, online news sources, websites, websites that include web logs (i.e., blogs), social networking sites (e.g., Facebook, Twitter, etc.) and/or other types of data sources.

The user devices 104, the question answering system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Figure 2:
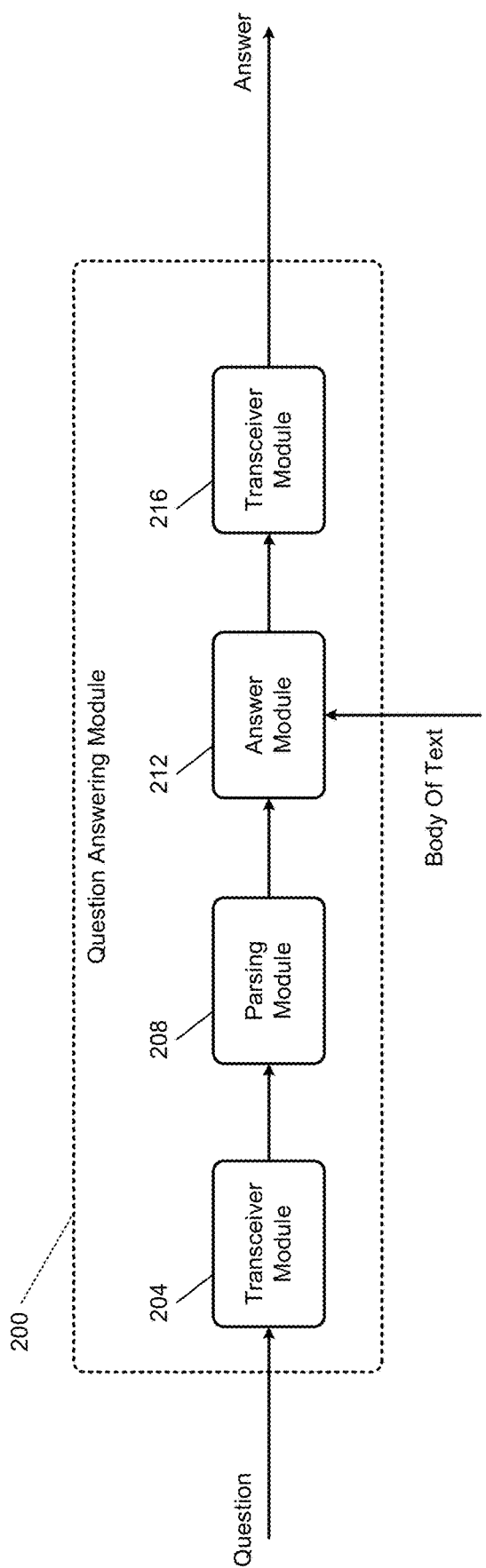
FIG. 2 includes a functional block diagram including an example implementation of a question answering module of the question answering system.

FIG. 2 is a functional block diagram including an example implementation of the question answering module 200 of the question answering system 102. A first transceiver module 204 receives a query including a question from a user device 104. The transceiver module 204 may also receive a body of text from the user device 104.

A parsing module 208 parses the query to obtain the question that is to be answered from the body of text. The parsing module 208 may, for example, identify a string of one or more words forming the question to be answered. The parsing module 208 may also perform correct any misspelled words in the question and/or perform one or more other word processing functions on the question.

An answer module 212 determines the answer to the question from the body of text. The body of text may be transmitted by the user device 104 along with the question. Alternatively, the body of text may be obtained by the answer module 212 from a data source. The answer module 212 may determine the body of text to be obtained, for example, based on the question. As an example, the question may be, "how many different monster trucks are there in the book Elbow Grease?". In this example, the answer module 212 may determine that the body of text from which to generate the answer is the book Elbow Grease. The answer module 212 may obtain the text of the book Elbow Grease from a data source. In the example above, the question is "how many different monster trucks are there?".

The answer module 212 includes an end-to-end memory network (MemN2N) (e.g., a gated MemN2N (GMemN2N) network), an artificial neural network, a convolutional neutral network (CNN), or another suitable type of model trained as described below to determine the answers to the questions from the bodies of text. The answer module 212 may include any parametric function that can be trained to answer questions from bodies of text. Training of the answer module 212 is discussed further below.

A second transceiver module 216 transmits the determined answer to the question back to the user device 104. In various implementations, the second transceiver module 216 may be omitted, and the first transceiver module 204 may transmit the answer back to the user device 104 from which the question was received.

Figure 3:
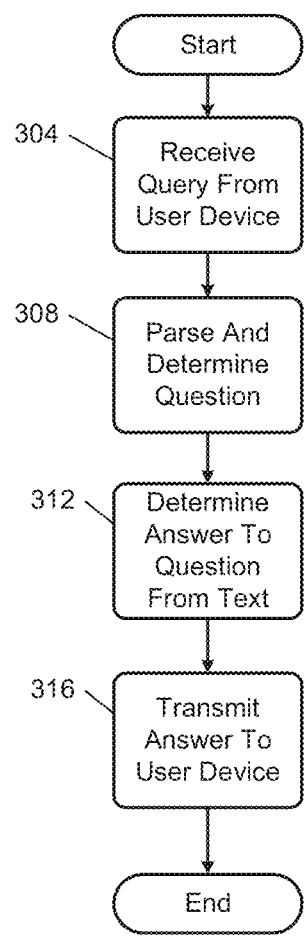
FIG. 3 includes a flowchart depicting an example method of receiving a question regarding a body of text and providing an answer to the question.

FIG. 3 includes a flowchart depicting an example method of receiving a question regarding a body of text and providing an answer to the question. The example of FIG. 3 may be performed by the question answering module 200.

Control begins with 304 where the question answering module 200 receives a query from a user device 104. The query includes a question to be answered about a body of text. The query may also include the body of text that is to be used as the basis for answering the question. At 308, the question answering module 200 parses the query and determines the question to be answered.

The question answering module 200 determines the answer to the question from the body of text at 312 using the model (e.g., the GMemN2N network). The question answering module 200 also obtains the body of text identified in the query if the body of text is not sent by the user device 104. At 316, the question answering module 200 transmits the answer to the question back to the user device 104. The question answering module 200 may discard the body of text or, for example, store the body of text in a database. Storing the body of text may allow for later question answering from the body of text without receiving another copy of the text.

A GMemN2N network is based on two different memory cells and an output prediction. An input memory representation $\{m_i\}$ and an output representation $\{c_i\}$ are used to store embedded representations of inputs. For example, an input of the model may be a tuple (d, q) where d is a document (i.e., a set of sentences $\{s_i\}$) and q is a question about document d. The entire set of sentences is converted into input memory vectors $m_i = A\Phi(s_i)$ and output memory vectors $c_i = C\Phi(s_i)$, using two embedding matrices A and C. The question q is also embedded using a matrix B, where $u = B\Psi(q)$, where the matrix B has the same dimensions as the matrices A and C. $\Phi$ and $\Psi$ are respectively the sentence embedding function and the question embedding function described further below.

The input memory is used to compute the relevance of each sentence in its context regarding the question by computing the inner product of the input memory sentence representation with a query. A softmax function is used to compute the probability distribution. The response $$o = B\Sigma_i p_i c_i,$$

from the output memory is the sum of the output memory vectors $\{c_i\}$ weighted with the sentence relevances calculated before $$p_i = \text{softmax}(u^T m_i),$$

where $$\text{softmax}(a_i) = \frac{e^{a_i}}{\sum_{j \in [1,n]} e^{a_j}},$$

The model uses a gated mechanism when the value of the controller u is updated, where $$T^k(u^k) = \sigma(W_T^k u^k + b_T^k) u^{k+1} = o^k \odot T^k u^k + u^k \odot (1 - T^k(u^k)).$$

Assuming a model with K hops of memory, the final prediction is $$a = \text{softmax}(W(o^K + u^K)),$$

where W is a matrix of the size d×v where v is the number o candidate answers. The model may not use the adjacent or layer-wise weight tying scheme, and all the matrix $A^k$ and $B^k$ of the multiple hops are different.

To build the sentence representations, the model uses a 1-dimensional convolutional neural network (CNN) with a list of filter sizes over all of the sentences. Let $[s_1, \ldots, s_N]$ be the vectorial representation of a document with N sentences, where $s_i = (w_{i,1}, w_{i,2}, \ldots, w_{i,n})$ is the i-th sentence which contains n words (w). Given a convolutional filter $$F \in \mathbb{R}^{h*d},$$

where h is the width of the convolutional window (the number of words it overlaps), the convolutional layer produces $$c_{i,j} = f(F \odot [Ew_{i,j}, \ldots, Ew_{i,j+h}]), \forall j \in [1, n-j],$$

where ⊙ is elementwise multiplication, f is a rectified linear unit (ReLU), b is a bias term, and E is the embedding matrix of size d*V, where V is the vocabulary size and d is the word embedding size. The model applies a max pooling operator to this vector to extract features. Given a filter F, after a convolutional operation and a max pooling operation, the model obtains a feature $$\hat{c}_i = \max_j(c_{i,j})$$

from the i-th sentence of the text. The model uses multiple filters with varying sizes. For example, assuming that the model uses $N_s$ different filter sizes and $N_f$ for each size, the model is able to extract $N_s \times N_f$ features for one sentence. The final representation of the sentence $$\Phi(s_i) = [\hat{c}_{iF1}, \hat{c}_{iF2}, \ldots, \hat{c}_{iF_{N_s*N_f}}]$$

is the concatenation of the extracted features from all of the filters.

Figure 4:
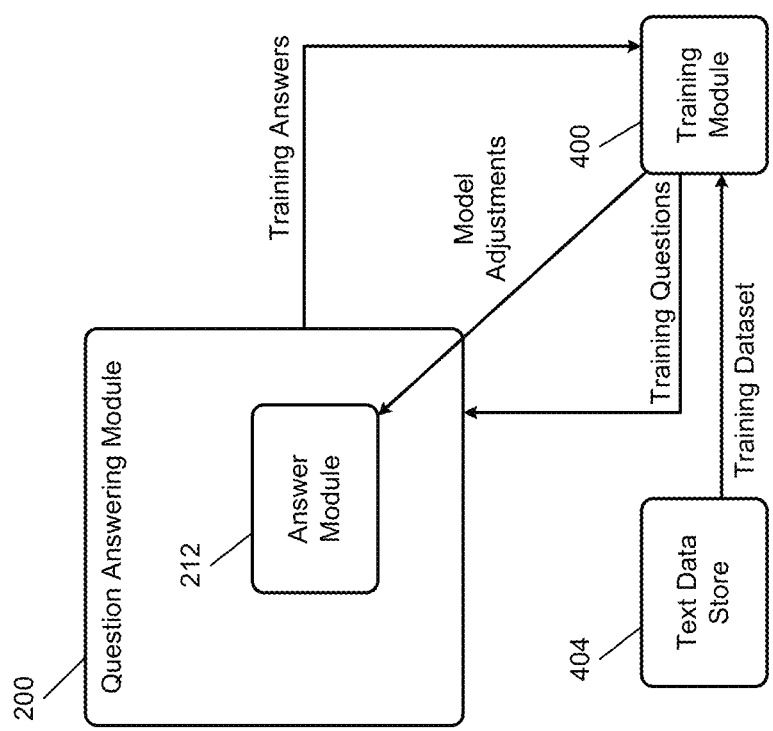
FIG. 4 includes a functional block diagram of a training system for training a model used by the question answering module to determine answers to received questions, respectively.

FIG. 4 includes a functional block diagram of a training module 400 for training the model used by the question answering module 200 to determine answers to received questions, respectively. As described above, the question answering module 200 comprehends text and provides answers to questions regarding the text. In the example of training, the question answering module 200 provides answers to questions regarding stories of a training dataset. The training dataset is stored in a text data store 404. Text datasets may be referred to as text corpuses.

The training module 400 generates the questions and provides stories of the training dataset to the question answering module 200. The training module 400 obfuscates (e.g., marks as unknown) spans of the training dataset to make the question answering harder for the question answering module 200. The training module 400 changes which portion (passage) of the training dataset is obfuscated over time in order to minimize the probability of the question answering module 200 correctly answering the provided question given the training dataset with obfuscations. In this way, the learning of the question answering module 200 is made harder by the obfuscations made by the training module 400. In parallel with the learning of the question answering module 200, the training module 400 learns the correctness of the answers generated by the question answering module 200 and progressively harder obfuscates portions of the training dataset as the ability of the question answering module 200 to correctly answer the questions improves.

The question answering module 200 and the question answering module 200 learn and improve their performance by acting against each other, similar to game play, in sparing patterns. This gradually improves the performance of both the question answering module 200 and the question answering module 200. By obfuscating portions of the training text, the question answering module 200 artificially increases the size of the dataset used to train the question answering module 200. Also, the adaptive behavior of the training module 400 making the challenges harder prevents catastrophic forgetting by the question answering module 200.

The training is a turn-based question and answering game involving multiple rounds. At the beginning of a round, the training module 400 obfuscates one word of a training story of a training dataset. The training dataset includes multiple stories. A first predetermined percentage of the stories of the training dataset are possible training stories. The training module 400 selects one of the possible training stories as the training story for the round, and obfuscates one word in the training story (i.e., the selected one of the possible training stories). The first predetermined percentage is less than 100 percent and may be, for example, 80 percent of the total number of stories of the training dataset.

The ratio of obfuscated words to non-obfuscated (clear) words is fixed to a ratio $\lambda \in \mathbb{R}^{[0,1]}$. Too low of a percentage of obfuscated words may have a limited effect on the training, and too large of a percentage of obfuscated words may prevent the question answering module 200 from learning well.

A second predetermined percentage of the stories of the training dataset are possible test stories. The training module 400 obfuscates one word of a test story. The training system selects one of the possible test stories as the test story for the round, and obfuscates one word in the test story (i.e., the selected one of the possible test stories). The second predetermined percentage is less than 100 percent and may be, for example, 10 percent of the total number of stories of the training dataset.

A third predetermined percentage of the 400 of the training dataset are possible validation stories. The training system selects one of the possible validation stories as the validation story for the round, and does not obfuscate any words in the validation story (i.e., the selected one of the possible validation stories). The third predetermined percentage is less than 100 percent and may be, for example, 10 percent of the total number of stories of the training dataset. The sum of the first predetermined percentage, the second predetermined percentage, and the third predetermined percentage is 100 percent.

For each round, the question answering module 200 is trained using selected training story. The training module 400 then tests the question answering module 200 using the selected test story and the selected validation story to determine the accuracy of the training. The training module 400 determines a reward based on the performance of the question answering module 200 to correctly answer a questions about the test story and a question about the validation story. The reward may also be referred to as a performance index or a bias. Given a tuple (d, $d_{obf}$, q) where d is the validation story (not including obfuscated words), $d_{obf}$ is the test story with the obfuscated word, and q is the associated question, the reward (r) is defined as follows:

$$r = \begin{cases} 1 \text{ if the question answering module answered correctly} \\ \quad\quad \text{on } d \text{ and failed on } d_{obf} \\ 0 \text{ otherwise} \end{cases}$$

The reward is a direct measurement of the impact of the obfuscation on the performance of the question answering module 200.

The above is done for each round.

All of the previously collected rewards are stored and used by the question answering module 200 for experience replay throughout the turns (rounds). After each learning turn, all of the parameters of the training module 400 may be reinitialized and retrained on all of the recorded rewards. Throughout the turns, the training module 400 accumulates information about the behavior of the question answering module 200 and proposes more challenging tasks from round to round. The question answering module 200 improves turn by turn and any catastrophic forgetting is compensated at the next turn of the training module 400 by focusing on flaws.

Below is pseudo-code for the adversarial training of the question answering module 200 that may be performed by the training module 400.

---

Split training dataset into 3 pieces (A) training stories (80%), (B) validation stories (10%), (C) test stories (10%)
Create D, an empty dataset
epoch = 0
while epoch < NB_MAX_EPOCHS do
    Split A into A1 (80%) and A2 (20%)
    If epoch=0 then
        Randomly corrupt (obfuscate) 20% of A1 and 100% of A2
    else
        Reinitialize all the parameters of the training module 400
        Train the training module 400 on D
        training system corrupts 20% of A1 and 100% of A2
    end if
    Train one epoch of question answering module 200 on A1
    Let A2_clear be the dataset that contains the same data as A2 but without corruption
    Test question answering module 200 on A2 and A2_clear
    for all (d ∈ A2, d_clear ∈ A2_clear) do
        Let r be the reward given to the training module 400
        if the question answering module 200 answers correctly on d_clear and incorrectly on d, then
            D ← {D ∪ (d, r=1)}
        else if the question answering module 200 answers correctly on d_clear and correctly on d, then
            D ← {D ∪ (d, r=0)}
        end if
    end for
    test the question answering module 200 on B and see if the training should stop
    epoch ← epoch +1
end while
test the reader on C and report results

---

Let â be a predicted distribution and a be the ground-truth. Categorical cross entropy $$L_{Trainer} = -\Sigma_{i=1}^{N} \Sigma_{j=1}^{V} a_{ij} \log(\hat{a}_{ij})$$

is the loss function for the question answering module 200 as the model decision is a distribution over a vocabulary. Binary cross entropy $$L_{answerer} = -\Sigma_{i=1}^{N} [a_i \log(\hat{a}_i) + (1-a_i)\log(1-\hat{a}_i)]$$

is used as the loss function for the training module 400.

One word is obfuscated in stories of the training dataset using a uniform sampling strategy. This is a naïve variation where the training module 400 does not learn from the answers of the question answering module 200. This is similar to a dropout regularization that avoids overfitting of the training dataset. Without the training module 400 learning from the answers of the question answering module 200, however, adaptive dropout and learning of easier and harder challenges may be lost. The present application improves the robustness of the training (and resulting question answering module 200) relative to standard learning and supervised learning.

The training module 400 is configured to predict the probability of the question answering module 200 to successfully (correctly) answer a question given a document with an obfuscated word. This is used by the training module 400 to determine the position of the obfuscated word in the document (i.e., which word to obfuscate) to maximize the probability of the question answering module 200 not successfully (incorrectly) answering the question. The training module 400 includes an end-to-end memory network (MemN2N) (e.g., a gated MemN2N (GMemN2N) network), an artificial neural network, a convolutional neutral network, or another suitable type of model trained as described below to provide the input to the question answering module 200. The training module 400 may include any parametric function that can be trained to provide the input to the question answering module 200. The last layer of the sigmoid function of the model of the training module 400 is used to predict the probability of the question answering module 200 to fail on the input:

$$\hat{a} = \sigma(W(o^K + u^K)) \text{ where}$$

$$\sigma = \frac{1}{1+e^{-x}}$$

and
$\hat{a} \in [0,1]$ is the predicted probability of failure of the question answering module 200, and W is a matrix of size d×1.

To obfuscate a word, the training module 400 replaces the word with "unk" for unknown or another suitable indicator of a lack of knowledge of the word. The output of the training module 400 is a real number $r \in [0,1]$ which is the expected probability of the question answering module 200 to fail on the question. The training module 400 is configured to select stories which maximize the reward (r). The training module 400 uses the same text passage and query representation as the question answering module 200 and is based on a CNN with different filter sizes for the document and the last hidden states of a bidirectional gated rectified unit (GR) recurrent network for the question encoding. Both the model of the question answering module 200 and the model of the training module 400 are fully differentiable.

Examples of the training dataset include a Cambridge dialog dataset titled "A network-based end-to-end trainable task-oriented dialog system" by Wen, et al., a Trip Advisor Aspect-based sentiment analysis titled "Latent aspect rating analysis on review text data; A rating regression approach" by Wang, et. al, and a children's book test dataset titled "The goldilocks principle: Reading children's books with explicit memory representations" by Hill, et. al. In various implementations, the training module 400 may train the question answering module 200 as described above using more than one training dataset.

As an experiment, 10% of a training dataset was reserved to create a test dataset. For the training, the training dataset was further split to extract a validation dataset to allow for early stopping of the training. An Adam optimizer was used and a starting learning rate of 0.0005 was used. Dropout was set to 0.9 meaning that, during training, 10% of the parameters randomly selected are not used during the forward pass and not updated during the backward propagation of error. A gated memory mechanism that dynamically regulates the access to memory blocks described above was also used. The gated memory mechanism had a positive effect on the overall performances of the models. All weights were initialized randomly from a Gaussian distribution with zero mean and $\sigma=0.1$. The loss was penalized with the sum of the $L_2$ of the parameters of the models.

The batch size was set to 16 inputs, and an embedding word size of 300 was used. All of the embedding matrices were initialized with pre-trained GloVe word vectors described in "Glove: Global vectors for word representation" by Pennington, et. al.

The CNN encoding improves the overall accuracy of the model compared to LSTM and also improves stability by decreasing the variance of the results. In practice, the models may implement 128 filters of size 2, 3, 5, and 8 for a total of 512 filters for the one-dimensional convolutional layer.

Each training was repeated 10 times for two different datasets and the maximum and average accuracy was reported for each dataset. The maximum is the score on the test set of the best of the 10 trained models based on the validation set. During the adversarial learning, the dataset contained 70% of clear dialogs and 30% corrupted dialogs, $\lambda=0.3$. Inside the corrupted data, 20% were randomly obfuscated by the training module 400 in order to make the question answering module 200 to learn from exploration, and the training module 400 maximized its reward for the remaining 80%. To fit with the format of the datasets, the output layer of the question answering module 200 may be modified for the task. Instead of projecting on a set of candidate answers, the last layer of the question answering module 200 makes a projection on the entire vocabulary $$\hat{a} = \sigma(M \odot W(o^K + u^K))$$

where W is a matrix of the size V×d with V being the vocabulary size, $\odot$ being the elementwise product, and M the mask vector of size V containing 1 if the corresponding word is proposed in the candidate answers and 0 otherwise.

The results of the experiment are as follows:

TABLE 1

Average and maximum accuracy (%) on the Cambridge dataset on 10 replications of GMemN2N, uniform GMemN2N, and adversarially trained GMemN2N.

| Hops | Log Reg | ASR | GMemN2N | | | Uniform GMemN2N | | | Adversarial GMemn2N | | |
|---|---|---|---|---|---|---|---|---|---|---|---|
| | | | 4 | 5 | 6 | 4 | 5 | 6 | 4 | 5 | 6 |
| Max | 58.4 | 40.8 | 82.1 | 85.8 | 80.6 | 85.1 | 85.8 | 82.8 | 82.8 | 79.8 | 88.1 |
| Mean | 58.2 | 39.5 | 76.9 | 74.8 | 74.2 | 77.4 | 77.7 | 74.9 | 79.8 | 77.8 | 79.6 |

TABLE 2

Average and maximum accuracy (%) on the TripAdvisor dataset on 10 replications of GMemN2N, uniform GMemN2N, and adversarially trained GMemN2N.

| Hops | Log Reg | ASR | GMemN2N | | | Uniform GMemN2N | | | Adversarial GMemn2N | | |
|---|---|---|---|---|---|---|---|---|---|---|---|
| | | | 4 | 5 | 6 | 4 | 5 | 6 | 4 | 5 | 6 |
| Max | 59.4 | 45.2 | 62.3 | 62.4 | 60.5 | 63.1 | 61.4 | 63.1 | 64.6 | 63.5 | 62.3 |
| Mean | 59.0 | 42.3 | 60.8 | 60.6 | 58.5 | 62.3 | 60.3 | 59.6 | 62.8 | 61.2 | 60.8 |

TABLE 3

Accuracy (%) on the CBT dataset for GMemN2N, uniform GMemN2N, and adversarially trained GMemN2N.

| | Log Reg | | | | ASR | | | |
|---|---|---|---|---|---|---|---|---|
| Task | P | V | NE | CN | P | V | NE | CN |
| Max | 56.3 | 37.1 | 26.5 | 25.6 | 24.7 | 32.7 | 22.1 | 18.3 |

TABLE 3-continued

Accuracy (%) on the CBT dataset for GMemN2N, uniform GMemN2N, and adversarially trained GMemN2N.

| | GMemN2N | | | | uniform GMemN2N | | | | adversarial GMemn2N | | | |
|---|---|---|---|---|---|---|---|---|---|---|---|---|
| Task | P | V | NE | CN | P | V | NE | CN | P | V | NE | CN |
| Max | 56.0 | 58.5 | 31.9 | 39.0 | 58.1 | 53.6 | 31.6 | 34.0 | 71.1 | 60.4 | 35.3 | 39.4 |

Figure 5:
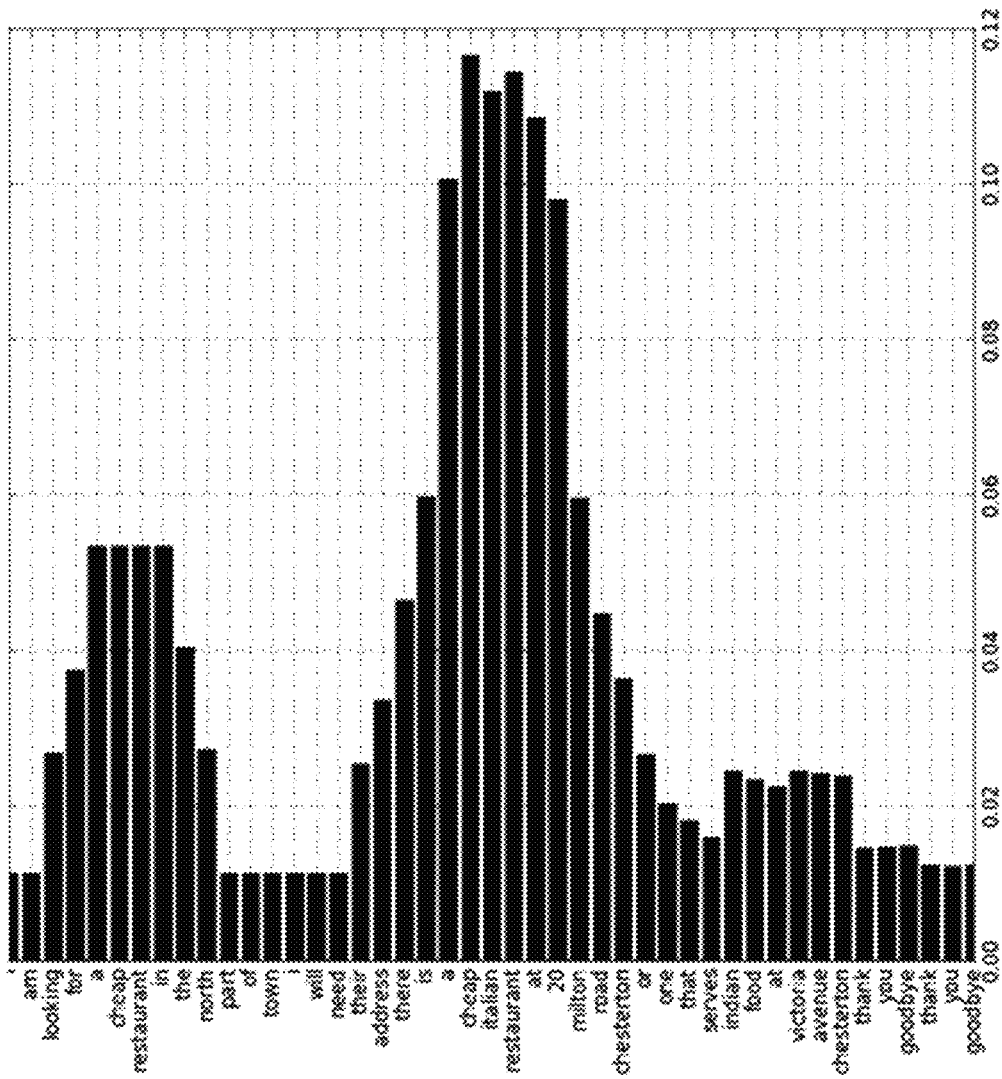
FIG. 5 includes the expected reward (probability of success of the training system) for each word of a document (story) after multiple rounds using a dataset.

FIG. 5 includes the expected reward (probability of success of the training module 400) for each word of a document (story) after multiple rounds using a dataset. Given the tuple (d, q) where d is the clear document (without obfuscations) and q is the question, assuming that the document contains k words, k corrupted documents are created where one different word is obfuscated in each of the k corrupted documents. In FIG. 5, the y-axis represents the words of the document, and the x-axis represents the expected reward for the training system if that word is obfuscated. The word "cheap" is the answer to the question "price range" in this example.

The training module 400 described above tends to obfuscate important words in the stories. The training module 400 as described above also hones in on a span of words including an important word, not just the important word itself. This may be due to the encoding, which is not only a representation of a word but a representation of a word in its context.

Figure 6:
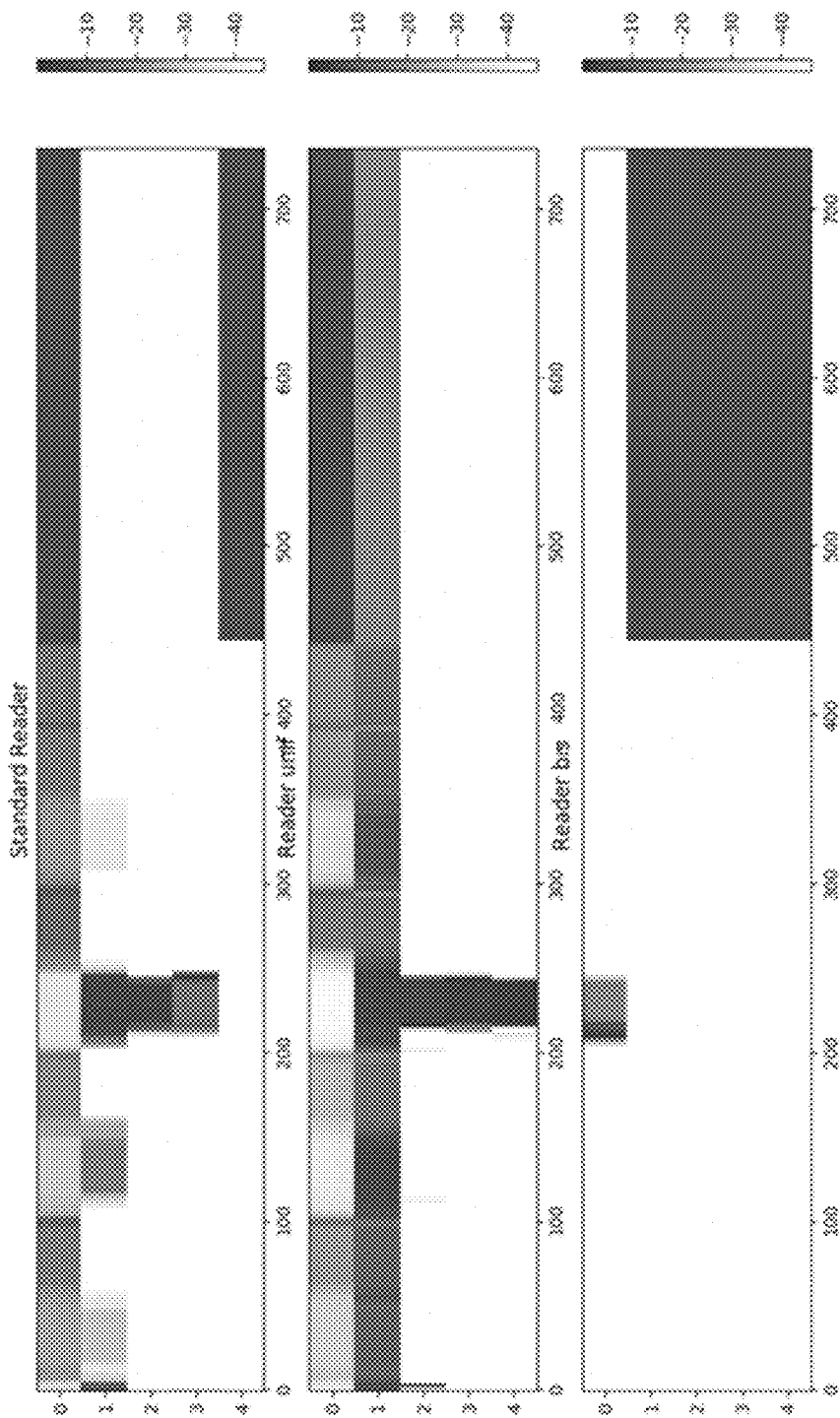
FIG. 6 includes an example graph of attention values, represented by hops, over a document from a dataset.

FIG. 6 includes an example graph of attention values, represented by hops, over a document from a dataset. The document was chosen such that only the adversarial training above would provide the question answering module 200 with the ability to correctly answer questions regarding the document. FIG. 6 displays attention distributions for question answering modules trained with three different protocols, the top graph illustrating standard training, the middle graph illustrating uniform training, and the bottom graph illustrating adversarial training. FIG. 6 illustrates that the standard and universal training provide comparable results. The adversarial trained model, however, behaves differently regarding the attention mechanism. The adversarial training captures the important part of the sentence or document at the first hop and uses the remaining 4 hops to focus more largely on the end of the document. This may be due to the adversarial training forcing the question answering module 200 to look to different parts of the sentence and document instead of focusing on one point during the training.

Figure 7:
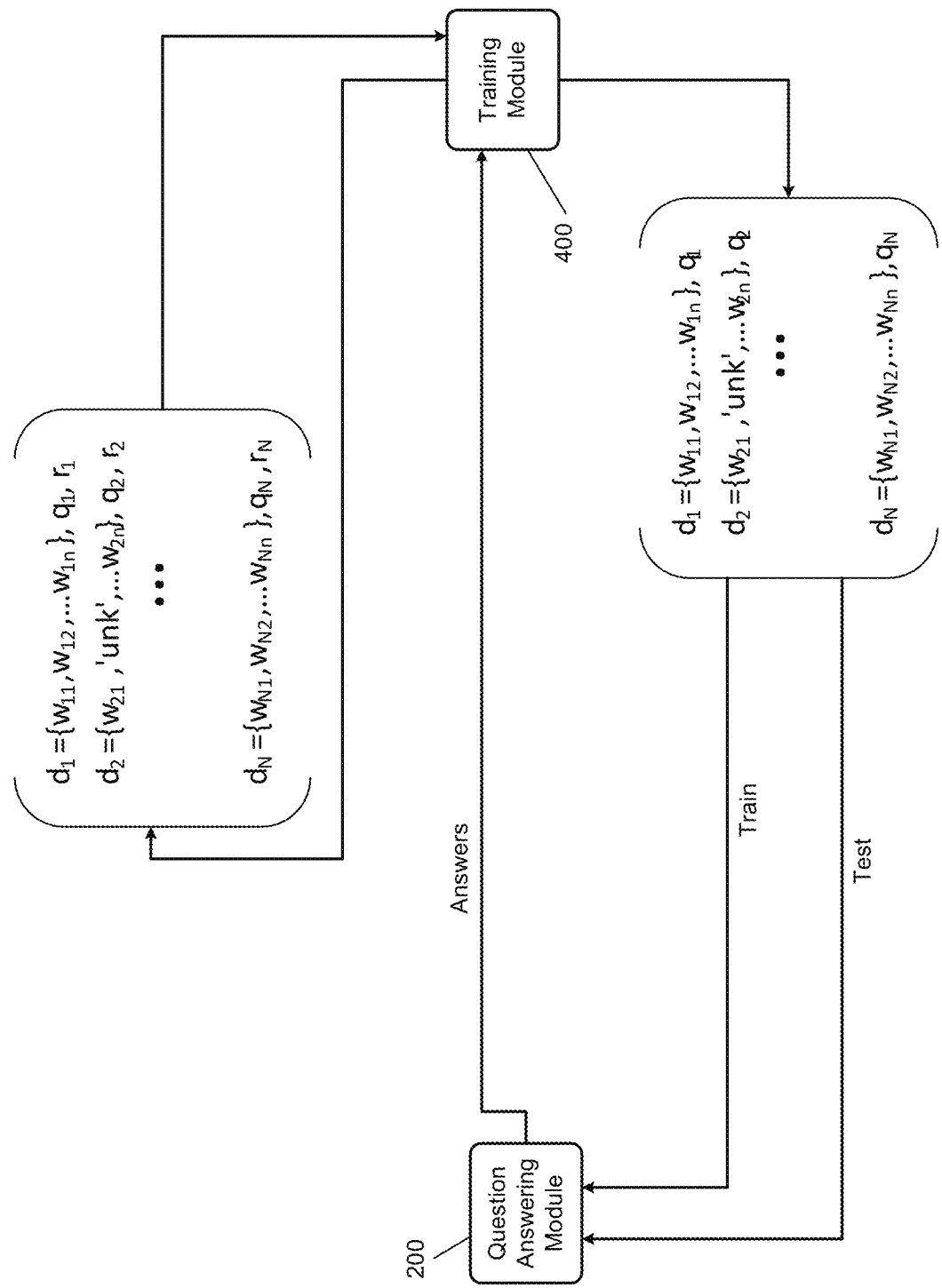
FIG. 7 includes a functional block diagram illustrating the question answering module and the training system.
Figure 8:
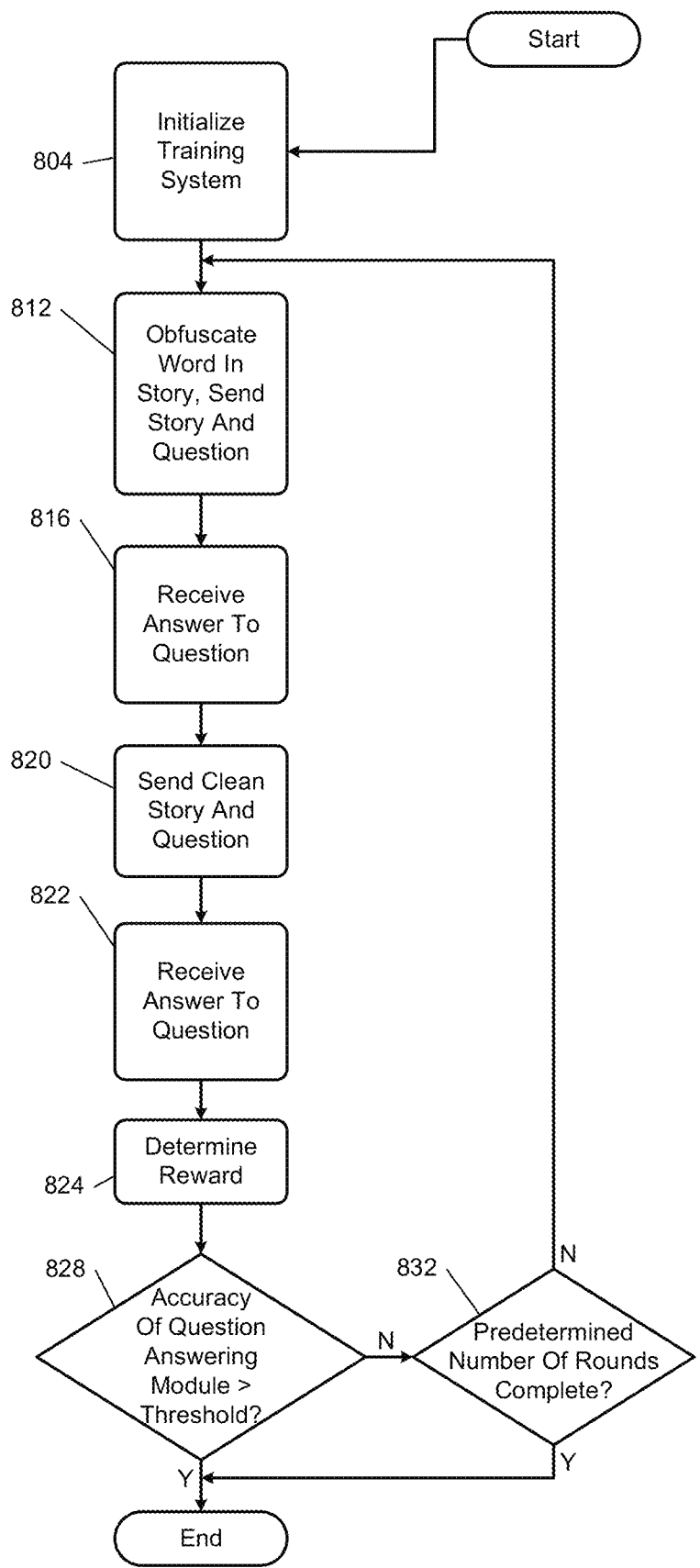
FIG. 8 includes a flowchart depicting an example method of training the question answering module that may be performed by the training system.

FIG. 7 includes a functional block diagram illustrating the question answering module 200 and the training module 400. FIG. 8 includes a flowchart depicting an example method of training the question answering module 200 that may be performed by the training module 400. Control begins with 804 where the training module 400 initializes its model to predetermined initialization values and obtains the training dataset.

At 812, the training module 400 selects a story from the training dataset and obfuscates one word of the selected story. The training module 400 sends the selected story (including the obfuscated word) and a question to the question answering module 200. At 816, the training module 400 receives the answer to the question from the question answering module 200.

At 820, the training module 400 sends a clean version of the selected story (without the obfuscated word) and the question to the question answering module 200. At 822, the training module 400 receives the answer to the question from the question answering module 200.

At 824, the training module 400 determines the reward for the round. If the question answering module 200 answered correctly to the clean version of the selected story and answered incorrectly to the selected story with the obfuscated word, the reward is 1. Otherwise, the reward is zero.

At 828, the training module 400 may determine whether an accuracy of the question answering module 200 is greater than a threshold value. For example, the training module 400 may determine an average of the reward values of each round is less than a threshold value at 828. If 828 is true, control may end. If 828 is false, control may transfer to 832. At 832, the training module 400 may determine whether a predetermined maximum number of rounds have been completed. If 832 is false, control may return to 812. If 832 is true, control may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-executable method for training a machine reading network, comprising:
  by a first neural network, analyzing a first text corpus extracted from a training dataset comprising a plurality of text corpuses;
  by a second neural network, obfuscating words of a passage of the first text corpus in order to train the first neural network, the obfuscation producing a first corrupted text corpus, the first text corpus including the words obfuscated in the first corrupted text corpus;
  by the second neural network, generating a first question about content of the first corrupted text corpus;
  by the first neural network, analyzing the first corrupted text corpus and determining a first answer to the first question based on the first corrupted text corpus;
  by the second neural network, analyzing the first answer of the first neural network and generating a first performance index for the first neural network based on the first answer, the first corrupted text corpus, and the first text corpus including the words obfuscated in the first corrupted text corpus, the first performance index representing a first answering performance of the first neural network given the obfuscation of the first corrupted text corpus;
  by the second neural network storing the first performance index in memory;
  by the second neural network, generating a second corrupted text corpus by obfuscating words of a second text corpus extracted from the training dataset, the obfuscation being based on the first performance index of the first neural network and the second text corpus including the words obfuscated in the second corrupted text corpus;

by the second neural network, generating a second question about content of the second corrupted text corpus;

by the first neural network, analyzing the second corrupted text corpus and determining a second answer to the second question based on the second corrupted text corpus;

by the second neural network, analyzing the second answer of the first neural network and generating a second performance index for the first neural network based on the second answer, the second corrupted text corpus, and the second text corpus including the words obfuscated in the second corrupted text corpus, the second performance index representing a second answering performance of the first neural network given the obfuscation of the second corrupted text corpus;

by the second neural network storing the second performance index in memory; and retraining parameters of the second neural network based on the first performance index and the second performance index including adjusting one or more of the parameters of a gated memory mechanism of the second neural network based on the second neural network obfuscating progressively harder portions in future corrupted text corpuses and decreasing a likelihood of future performance indexes indicating that future answers generated based on the future text corpuses are correct.

2. The method of claim 1, wherein the obfuscation includes marking the words as unknown in the first and second corrupted text corpuses.

3. The method of claim 1 further comprising:
by the second neural network, generating a third corrupted text corpus by obfuscating words of a third text corpus extracted from the training dataset, the obfuscation being based on the first performance index of the first neural network and the second performance index of the first neural network, the third text corpus not including the obfuscated words;
by the second neural network, generating a third question about content of the third corrupted text corpus;
by the first neural network, analyzing the third corrupted text corpus and determining a third answer to the third question based on the third corrupted text corpus;
by the second neural network, analyzing the third answer of the first neural network and generating a third performance index for the first neural network based on the third answer, the third corrupted text corpus, and the third text corpus not including the obfuscated words, the third performance index representing a third answering performance of the first neural network given the obfuscation of the third corrupted text corpus; and
by the second neural network storing the third performance index in memory.

4. A system comprising memory storing instructions for performing the method of claim 1 and a processor, in communication with the memory, which executes the instructions.

5. The method of claim 1 wherein the first neural network is a gated end-to-end memory network (GMemN2N), and wherein the second neural network is a GMemN2N.

6. The method of claim 1 further comprising:
by the first neural network, receiving a text corpus and a question regarding the text corpus from a user device;
by the first neural network, determining an answer to the question based on the text corpus; and
by the first neural network, transmitting the answer to the user device.

7. A computer-readable medium, on which is stored a computer program product comprising code instructions for executing the method of claim 1 for training a machine reading network.

8. A computer-executable method for training a machine reading network, comprising:
training a first neural network to analyze text corpuses and to answer questions regarding passages of the text corpuses; and
training a second neural network to generate a first corrupted text corpus by obfuscating words of a first passage of a first text corpus in order to minimize a probability of the first neural network correctly answering a first question regarding the first corrupted text corpus, the first text corpus including the words obfuscated in the first corrupted text corpus,
wherein the training the second neural network includes training the second neural network to:
analyze a first answer of the first neural network to the first question;
assess a bias in the first answer caused by the obfuscation of the words of the passage of the first text corpus based on the first answer, the first corrupted text corpus, and the first text corpus including the words obfuscated in the first corrupted text corpus; and
based on the bias in the first answer of the first neural network, generate a second corrupted text corpus by obfuscating words of a second passage of a second text corpus; and
retraining the second neural network based on performance of the first neural network in generating a second answer based on the obfuscation of the words of the second passage of the second text corpus including adjusting one or more parameters of a gated memory mechanism of the second neural network based on the second neural network obfuscating progressively harder portions in future corrupted text corpuses and decreasing a likelihood of future performance indexes indicating that future answers generated based on the future text corpuses are correct.

9. The method of claim 8 further comprising:
by the second neural network, rating performances of the first neural network in answering questions and storing data indicative of the performances of the first neural network,
wherein generating the second corrupted text corpus includes obfuscating words of the second passage of the second text corpus based on the data indicative of the performances in order to maximize the bias of the first neural network.

10. The method of claim 8, wherein the first neural network is a gated end-to-end memory network (GMemN2N), and
wherein the second neural network is a GMemN2N.

11. The method of claim 8 wherein the generating the second text corpus includes, based on the bias in the first answer of the first neural network, generating the second corrupted text corpus by obfuscating words of the second passage of the second text corpus to minimize a second probability of the first neural network correctly answering a second question regarding the second corrupted text corpus.

12. A method comprising:
the method of claim 8;
after the training of the first neural network:
receiving, by the first neural network from a user device, a text corpus and a question about the text corpus;
determining, by the first neural network, an answer to the question using the text corpus; and
transmitting, by the first neural network to the user device, the answer to the question.

13. A non-transitory computer readable medium comprising code including instructions to execute the method of claim 8 for training a machine reading network.

14. A method of using a first neural network, comprising;
by the first neural network, receiving a text;
by the first neural network, receiving a question concerning the text; and
by the first neural network, determining an answer to the question using the text,
wherein the first neural network is trained to answer the question about the text adversarially by a second neural network that is trained to maximize a likelihood of failure of the first neural network to correctly answer questions; and
by the second neural network, adversarially training the first neural network by selectively obfuscating words in stories of a training dataset based on maximizing the likelihood of failure of the first neural network to correctly answer questions,
the adversarial training including: determining performances of the first neural network based on (a) answers of the first neural network to questions regarding corrupted text corpuses including obfuscated words, (b) the corrupted text corpuses, and (c) text corpuses including the words obfuscated in the corrupted text corpuses; and, based on the performances, adjusting parameters of a gated memory mechanism of the second neural network based on the second neural network obfuscating progressively harder portions in future corrupted text corpuses and decreasing a likelihood of future performance indexes indicating that future answers generated based on the future text corpuses are correct.

15. The method of claim 14 further comprising, by the second neural network, presenting the first neural network with progressively harder questions regarding the stories.

16. The method of claim 14 further comprising, by the second neural network, altering the text by selectively obfuscating a word in each text for which the first neural network provides an answer.

17. The method of claim 16 further comprising, by the second neural network, choosing the word to obfuscate to maximize a probability of failure by the first neural network.

18. A method comprising:
the method of claim 14;
after the training of the first neural network:
receiving, by the first neural network from a user device, a text corpus and a question about the text corpus;
determining, by the first neural network, an answer to the question using the text corpus; and
transmitting, by the first neural network to the user device, the answer to the question.

* * * * *